United States Patent [19]
Schaeftlmeier et al.

[11] Patent Number: 5,313,698
[45] Date of Patent: May 24, 1994

[54] PROCESS FOR THE MANUFACTURE OF THE STATOR OF AN ELECTRICAL MACHINE

[75] Inventors: Roland Schaeftlmeier, Winnenden; Gerhard Pflueger, Markgroeningen; Bernhard Fakler, Esslingen; Klaus Georg Buerger, Markgroeningen; Albrecht Knorpp, Murr, all of Fed. Rep. of Germany

[73] Assignee: Robert Bosch GmbH, Stuttgart, Fed. Rep. of Germany

[21] Appl. No.: 924,038

[22] PCT Filed: May 10, 1991

[86] PCT No.: PCT/DE91/00385
§ 371 Date: Aug. 27, 1992
§ 102(e) Date: Aug. 27, 1992

[87] PCT Pub. No.: WO91/19347
PCT Pub. Date: Dec. 12, 1991

[30] Foreign Application Priority Data
Jun. 6, 1990 [DE] Fed. Rep. of Germany ....... 4018089

[51] Int. Cl.⁵ .............................. H02K 15/14
[52] U.S. Cl. .................................. 29/596; 264/272.2; 310/43; 310/71
[58] Field of Search ............................. 29/596, 548; 264/272.19, 272.2; 310/42, 43, 71

[56] References Cited
U.S. PATENT DOCUMENTS
1,584,502 11/1926 Apple .
3,758,799 11/1973 Dochterman .

FOREIGN PATENT DOCUMENTS
0062706 10/1982 European Pat. Off. .
0231785 12/1987 European Pat. Off. .
3128081 11/1982 Fed. Rep. of Germany .
8915212 10/1990 Fed. Rep. of Germany .
2218675 9/1974 France .

OTHER PUBLICATIONS
Patent Abstracts of Japan vol. 10, No. 27 (E-378) (2084) Japan GM/OS 57-65570/82.

Primary Examiner—Carl E. Hall
Attorney, Agent, or Firm—Michael J. Striker

[57] ABSTRACT

An electrical machine, preferably a three-phase alternator for vehicles, has a surface-cooled stator which has two stator plate stacks arranged one after the other in the axial direction with two stator windings inserted in the latter. The winding ends of the stator windings, which windings ends project out at the front side, and the two stator plate stacks are enclosed by a metal housing and fitted into the latter so as to conduct heat. For manufacturing the stator in a simple and compact manner accompanied by good heat conduction the stator plate stacks be be embedded in a heat conducting plastic together with spacing means and connection parts contacting the connection conductors of the stator windings in a compression mold with a base part supporting the connection parts so as to form a constructional unit.

9 Claims, 3 Drawing Sheets

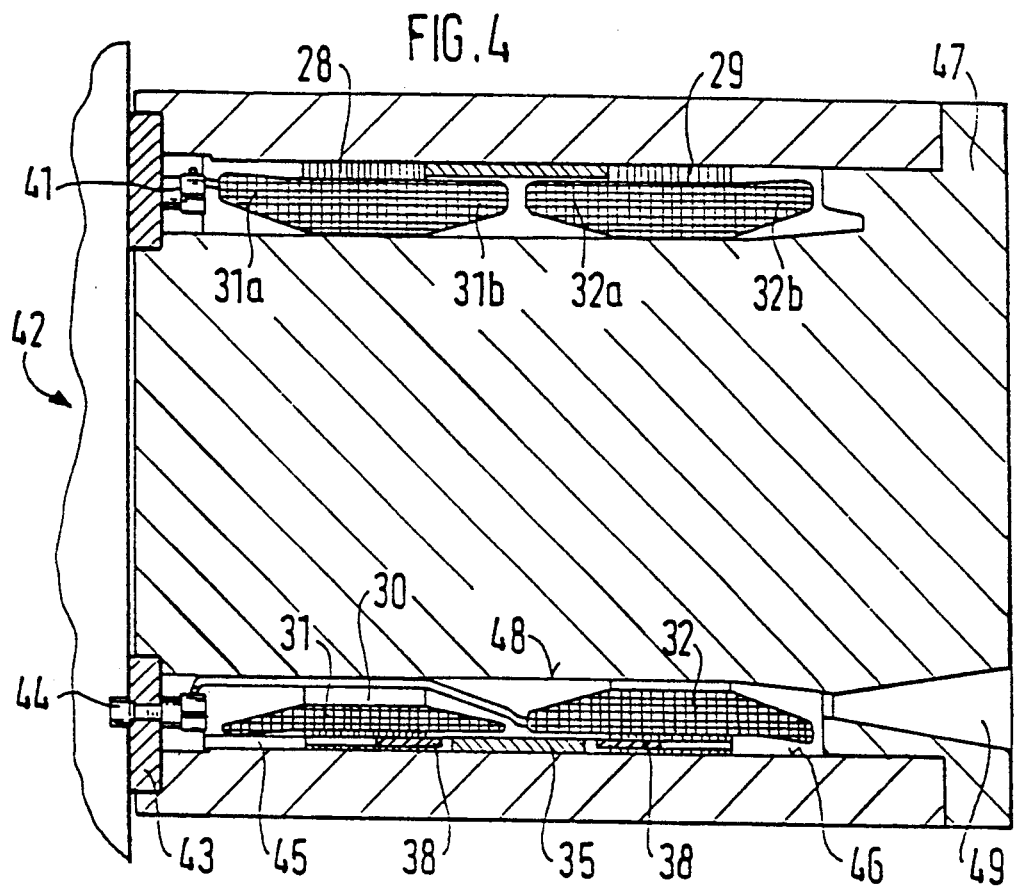
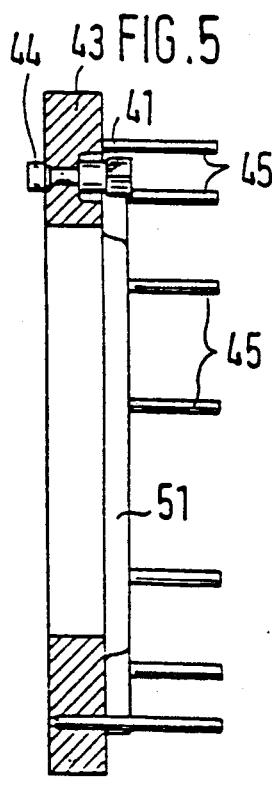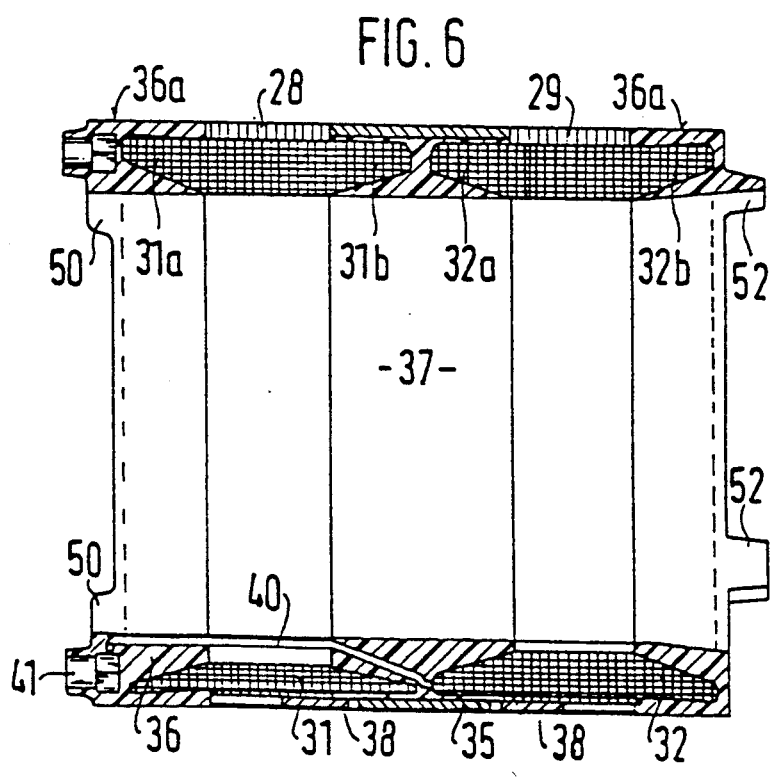

PROCESS FOR THE MANUFACTURE OF THE STATOR OF AN ELECTRICAL MACHINE

BACKGROUND OF THE INVENTION

The present invention relates to a process for manufacture of a stator of an electrical machine, preferably a three-phase alternator for vehicles.

It is already known from the Japanese Utility Model Publication 57-65570 to provide the stator housing of an electric motor with cooling ribs for guiding off heat. These cooling ribs, together with the annular spaces at the winding ends of the stator winding, are filled with a heat conducting mold resin after the stator plate stack has already been inserted into the housing with the stator winding. In so doing, the winding ends are completely embedded in the mold resin so that the heat losses generated in them can be guided out. A disadvantage of an electrical machine produced in this way consists in that the entire prefabricated stator, including its housing, must be inserted in a compression or injection mold for embedding the winding ends in heat conducting plastic, which requires special steps for sealing the injection or compression mold. Such a solution becomes even more costly when the electrical machine has two stator plate stacks with stator windings located one after the other in the axial direction, and when these systems are inserted into a pot-shaped stator housing in addition.

Such a three-phase alternator for motor vehicles having a double-generator system in a closed, water-cooled housing is known from DE-OS 31 28 081 (FIG. 5). The winding ends of the two systems are exposed. Consequently, due to the relatively poor heat conduction at the winding ends, the output of such an electrical machine is limited and its outer diameter is relatively large. Moreover, the two stator plate stacks are inserted into the cylindrical stator housing from both sides, which is not possible with a pot-shaped construction of the housing.

SUMMARY OF THE INVENTION

Accordingly it is an object of the present invention to provide the most inexpensive possible production and assembly of the stator in surface-cooled electrical machines having two stator systems located one after the other in the axial direction with good heat conduction and in a compact construction.

In keeping with these objects and with others which will become apparent hereinafter, one feature of the present invention resides, briefly stated, in a process for the manufacture of an electrical machine, preferably a three-phase alternator for vehicles, which is characterized in that the two stator plate stacks carrying the stator windings are first positioned relative to one another by spacing means for insertion into a compression mold, and the connection conductions of the rear stator winding are guided through slots of the front stator plate stack; in that connection parts for the stator windings are fastened at a base part of the compression mold so as to be detachable and the connection parts make contact with connection conductors of the stator windings; in that the two stator plate stacks are inserted into an outer annular wall of the compression mold at their outer diameter with the spacing means, and the stator plate stacks are received at their inner diameter by an inner annular wall of the compression mold with an axially guided male die, and in that a heat conducting plastic in the hot state is injected between the inner and outer annular wall so that the stator plate stacks, the spacing means, the windings end and the connection parts are embedded and/or anchored in the heat conducting plastic to form a structional unit.

When the process for the manufacture is performed in accordance with the present invention, it has the advantage that the two stator systems are manufactured beforehand so as to form a constructional unit in a compression mold by means of the heat conducting plastic in which the winding ends of the stator windings are embedded. A cylindrical or pot-shaped housing which is likewise manufactured beforehand can then be shrunk on to this constructional unit so that costly compression molds or assembly arrangements can be dispensed with. Since the plastic as well as the stator plate stacks have surface area contact with the inner surface of the machine housing after assembly, good heat conduction is ensured from the winding ends to the housing. Another advantage consists in that the connection parts for the connection lines of the two stator windings are anchored so as to be resistant to shaking and corrosion when the winding ends are embedded in the heat conducting plastic.

Advantageous further developments and improvements of are made possible by further features of the invention. For example, it is particularly advantageous to use an annular disk as the base part of the compression mold. The annular disk closes the space between the inner and outer annular wall of the compression mold and the connection parts for the connection lines of the stator windings in the form of threaded bushes are fastened by screws to the annular disk prior to the injection molding process. It is particularly advisable that the ends of the connection conductors be welded on a planar surface of a hexagonal portion of the threaded bushes which is subsequently embedded in heat conducting plastic. In this construction it is particularly advisable that the front end face of the front stator plate stack be arranged on a plurality of spacer pins fastened at the circumference of the annular disk prior to being embedded in the plastic in the compression mold in such a way that the connection parts are embedded in the heat conducting plastic prior to the front winding end so as to be resistant to shaking and corrosion. In so doing, every four connection parts for each of the two three-phase stator windings are advisably embedded adjacent to one another in the heat conducting plastic so as to form a connection group.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 4 shows the two preassembled stator systems in the compression mold;

FIG. 5 shows the base part of the compression mold; and

FIG. 6 shows the finished constructional unit of the alternator stator embedded in plastic.

DESCRIPTION OF THE EMBODIMENT EXAMPLE

Figure 1:
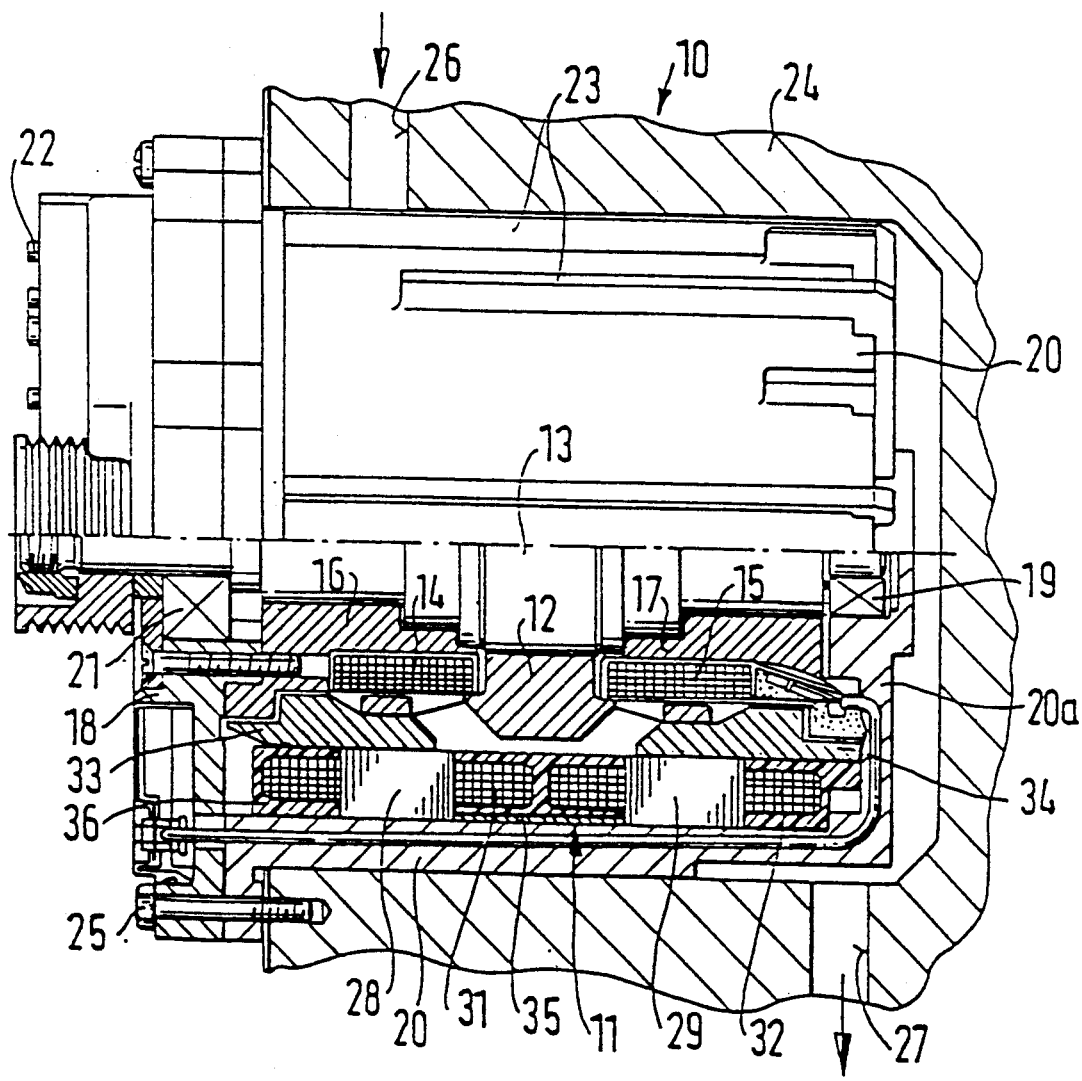
FIG. 1 a shows a three-phase alternator for motor vehicles with two generator systems, partially in cross section.
Figure 2:
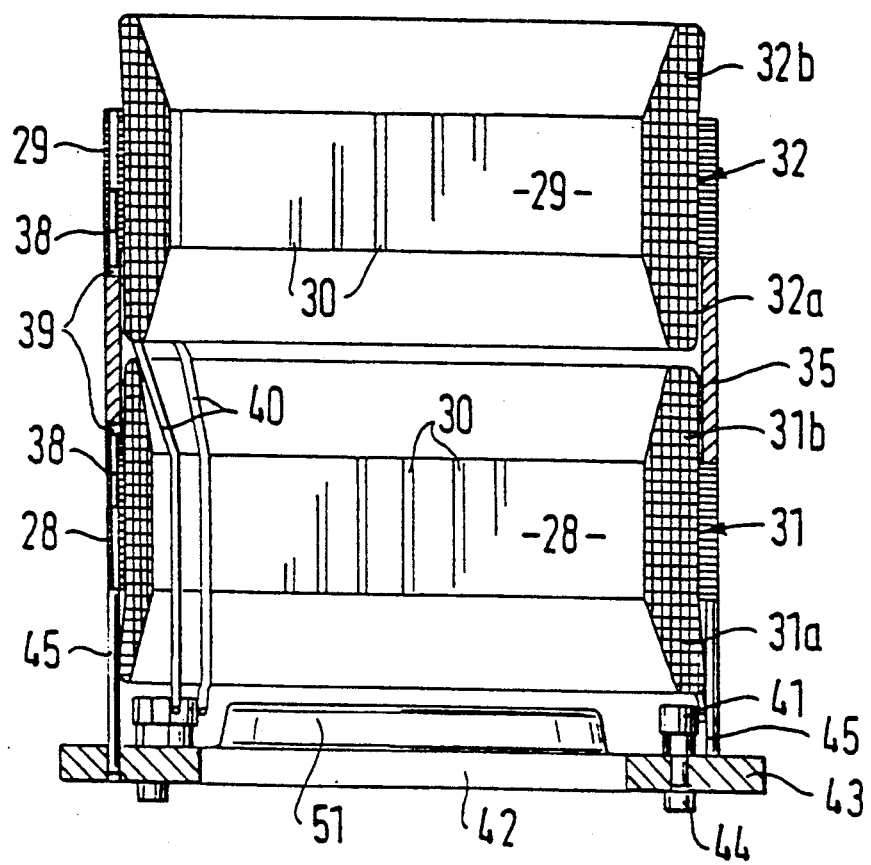
FIG. 2 shows the two preassembled stator plate stacks of the alternator with the stator windings and the base part of the compression mold.
Figure 3A:
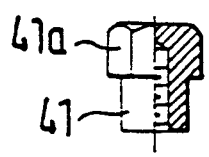
FIG. 3a shows a connection part.
Figure 3B:
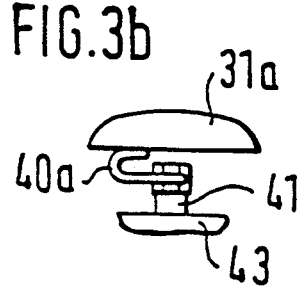
FIG. 3b shows the arrangement of a connection line of the stator winding at the connection part.

The three-phase alternator designated by 10 in FIG. 1 serves to supply power to motor vehicles, construction machines and the like. It includes a stator 11, a double-conducting piece rotor 12 in claw pole construction fastened on a drive shaft 13, and two exciter windings 14, 15 which are arranged on two pole rings 16, 17 and fastened at the housing base 20a or at a front bearing cover 18. The rear end of the drive shaft 13 is received in a first ball bearing 19 at the base 20a of a pot-shaped metal housing 20 of the alternator 10. The drive shaft 13 is received on the drive side via another ball bearing 20 in the bearing cover 18 which closes the metal housing 20 on the drive side and carries the electrical connections 22 of the three-phase alternator 10 and a rectifier and regulator arrangement, not shown. The liquid-cooled three-phase alternator is provided with spacer ribs 23 on the outside of the metal housing 20 and is inserted—as is shown—in a correspondingly shaped pot-shaped recess in the unit 24 of the vehicle and fastened at the latter by screws 25. The coolant is guided to the outer surface of the metal housing 20 via an inlet bore 26 to absorb the heat generated in the alternator 10 and to guide it off into the cooling circuit of the machine via an outlet bore 27.

The stator 11 of the three-phase alternator 10 contains two stator plate stacks 28, 29 which are situated one after the other in the axial direction, the stator windings 31, 32 being inserted in slots 30 of the latter and connected in a star connection or in some other manner. The stator windings 31, 32 cooperate with the double-conducting piece rotor 12 which has two claw pole systems 33, 34. The two stator plate stacks 28 and 29 are kept at a distance from one another by a metal spacer ring 35 and are positioned so as to be offset relative to one another by a half slot spacing. They are embedded along with the winding ends of the stator windings 31 and 32 in a heat conducting plastic 36 to form a prefabricated constructional unit 37.

FIGS. 2 to 5 show the various steps for producing this constructional unit 37. According to FIG. 2, the two stator plate stacks 31 and 32 are first held at a distance from one another axially by the spacer ring 35 and fixed with respect to one another by a plurality of positioning pins 38 which are distributed along the circumference of facing end faces of the two stator plate stacks 28, 29. In so doing, the positioning pins 38 are pressed into bore holes of the stator plate stacks. They engage with their free ends in correspondingly constructed recesses 39 at the end faces of the spacer ring 35. The recesses 39 are arranged in such a way that the two stator plate stacks 28, 29 are held in position so as to be offset by a half slot spacing. Moreover, the connection conductors 40 of the rear stator winding are guided through slots 30 of the front stator plate stack 28 at the front and bottom toward the connection side of the machine during this positioning of the stator plate stacks 31, 32. The ends 40a of the connection conductors 40 are contacted on a planar surface of a hexagonal portion 41a by threaded bushes 41 which are shown in an enlarged view in FIG. 3a and which form the connection parts of the stator 11. These connection parts are first fastened by screws 44 on an annular disk 43 constructed as the base part of a compression mold shown in FIG. 4 and the ends 40a of the connection conductor 40 are first bent forward according to FIG. 3b. The annular disk 43 further carries a plurality of spacing pins 45 which are distributed along its circumference according to FIG. 5 and on which the front end face of the front/lower stator plate stack 28 is placed in such a way that the connection parts 41 are positioned in front of the front/lower winding end 31a. Four connection parts and threaded bushes 41 are now brought together adjacent to one another to form a connection group for each of the two stator windings 31, 32. These two connection groups are located opposite one another. The ends 41a of the connection conductors 40, which ends 41a are bent forward, can now be welded at a planar surface of the hexagonal portions 41a of the threaded bushes 40.

According to FIG. 4, the two preassembled stator plate stacks 28, 29 are then inserted at their outer diameter along with the spacer ring 35 into an outer annular wall 46 of the compression mold 42 extending to the annular disk 43 as base part of the compression mold 42. The stator plate stacks 28, 29 are then received by an axially guided male die 47 of the compression mold 42 at their inner diameter by an inner annular wall 48. The annular disk 43 closes the space between the inner and outer annular walls 48, 46 as the base part of the compression mold 42. A heat conducting plastic, e.g. a polyester plastic combined with glass fibers, is now injected between the inner and outer annular walls 48, 46 via an inlet 49 of the male die 47 in the hot state accompanied by high pressure so that the stator plate stacks 28, 29, the spacer ring 35, the winding ends 31a, 31b, 32a and 32b, and the threaded bushes 41 are embedded and anchored in the heat conducting plastic 36 according to FIG. 6. In so doing, the two connection groups located opposite one another are embedded in axial projections 50 of the heat conducting plastic 36 so that the annular disk 43 in the base of the compression mold 42 is provided with a collar portion 51 between the two connection groups, which collar portion 51 extends up close to the front of the front winding end 31a. In a corresponding manner, projections 52 are also formed on at the plastic 36 in which the winding end 31b is embedded in the region of the rear winding end 32b by a corresponding shaping of the male die 47.

After the heat conducting plastic 36 cures, the compression mold 42 is opened, the screws 44 are removed from the threaded bushes 41 and the annular disk 43 with the spacer pins 45 is then removed from the front side of the stator constructional unit 37 which is now complete. The stator constructional unit 37, shown in FIG. 6, which is removed from the compression mold 42 is then inserted into the heated pot-shaped metal housing 20 and the projections 52 of the heat conducting plastic 36 at the rear winding end 32b serve as a stop at the base 20a of the pot-shaped metal housing 20. The metal housing 20 is then shrunk in a shrinking process on the outer annular surfaces 36a of the heat conducting plastic 36, the stator plate stack 31, 32 and the spacer ring 35 so as to conduct heat.

It will be understood that each of the elements described above, or two or more together, may also find a useful application in other types of constructions differing from the types described above.

While the invention has been illustrated and described as embodied in a process for the manufacture of the stator of an electrical machine, preferably a three-phase alternator, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A process of manufacturing an electrical machine with two stator plate stacks inserted at a distance from one another in a surface cooled metal housing one after the other in an axial direction, a stator winding being inserted in slots of the stator plate stacks and cooperating with two claw pole systems which are arranged on a drive shaft supported at opposite front sides of the machine, with the stator windings having winding ends which project out at a front and are enclosed by a metal housing for conducting off heat, the process comprising the steps of positioning the two stator plate stacks carrying the stator windings first relative to one another by spacing means for insertion into a compression mold; guiding connection conduits of a rear stator winding through slots in a front stator plate stack; fastening connection parts for the stator windings at a base part of a compression mold so that they are detachable and making contact of the connection parts with connection conductors of the stator windings; inserting the two stator plate stacks into an outer annular wall of the compression mold at their outer diameter with the spacing means; receiving the stator plate stacks at their inner diameter by an inner annular wall of the compression mold with an axially guided male die; injecting a heat conducting plastic in hot sate between the inner and outer annular wall so that the stator plate stacks, the spacing means, the winding ends and the connection parts are embedded in the heat conducting plastic to form a constructional unit.

2. A process as defined in claim 1, wherein said injecting includes injecting the heat conducting plastic so that the stator plate stacks, the spacing means, the winding ends and the connection parts are anchored in the heat conducting plastic to form a constructional unit.

3. A process as defined in claim 1; and further comprising the step of closing a space between the inner and outer annular wall by an annular disc which serves as base part of the compression mold; and fastening the connection parts on the annular disc detachably using threaded bushes and screws.

4. A process as defined in claim 3; and further comprising the step of welding of ends of the connection conduits of the stator windings on a planar surface of a hexagonal portion of the threaded bushes; and subsequently embedding the hexagonal portion in the heat conducting plastic.

5. A process as defined in claim 1; and further comprising the step of placing a front end face of a front stator plate stack on a plurality of spacing pins fastened at a circumference of the base part prior to being embedded in the plastic in the compression mold so that the connection parts are embedded in the heat conducting plastic prior to a front winding end.

6. A process as defined in claim 1; and further comprising the steps of embedding four said connecting parts for each of the two stator windings in the heat conducting plastic to form a connection group.

7. A process as defined in claim 6, wherein said embedding includes embedding two connection groups located opposite one another in an axial projection of the heat conducting plastic; and extending the base part close to a front winding end of the machine between the two connection groups at the base of the compression mold with two collar portions.

8. A process as defined in claim 1; and further comprising the step of holding the two stator plate stacks at an axial distance to one another by a heat conducting spacer ring.

9. A process as defined in claim 8; and further comprising the step of distributing a plurality of positioning pins along a circumference and pressing into boreholes of the plate stacks at front sides of the two stator plate stacks which face one another; and engaging the positioning pins into corresponding recesses at front sides of a spacer ring so that the two stator plate stacks are held in a mutually offset position by a half slot spacing.

* * * * *